(12) United States Patent
Hascoet et al.

(10) Patent No.: US 10,773,268 B2
(45) Date of Patent: Sep. 15, 2020

(54) DEVICE FOR ADDITIVE MANUFACTURING BY SPRAYING AND FUSION OF POWDER

(71) Applicant: ECOLE CENTRALE DE NANTES, Nantes (FR)

(72) Inventors: Jean-Yves Hascoet, Nantes (FR); Gilles Carabin, Germain St Moine (FR)

(73) Assignee: ECOLE CENTRALE DE NANTES, Nantes (FR)

(*) Notice: Subject to any disclaimer, the term of this patent is extended or adjusted under 35 U.S.C. 154(b) by 240 days.

(21) Appl. No.: 16/067,613

(22) PCT Filed: Dec. 31, 2016

(86) PCT No.: PCT/EP2016/082950
§ 371 (c)(1),
(2) Date: Jul. 1, 2018

(87) PCT Pub. No.: WO2017/114964
PCT Pub. Date: Jul. 6, 2017

(65) Prior Publication Data
US 2019/0009288 A1    Jan. 10, 2019

(30) Foreign Application Priority Data
Dec. 31, 2015  (FR) .................... 15 02753

(51) Int. Cl.
*B23K 26/00* (2014.01)
*B05B 7/22* (2006.01)
(Continued)

(52) U.S. Cl.
CPC .............. *B05B 7/228* (2013.01); *B05B 12/08* (2013.01); *B05B 15/14* (2018.02); *B05B 15/18* (2018.02);
(Continued)

(58) Field of Classification Search
CPC ......... B05B 7/228; B05B 12/08; B05B 15/14; B05B 15/18; B33Y 30/00; B22F 3/1055;
(Continued)

(56) References Cited

U.S. PATENT DOCUMENTS 4,121,085 A * 10/1978  Diemer ................... C08F 2/005
                                                             219/121.84
4,467,171 A *  8/1984  Ramos ............... B23K 26/1476
                                                             219/121.84
(Continued)

FOREIGN PATENT DOCUMENTS

| FR | 2 685 922 A1 | 7/1993 |
| FR | 2 971 723 A1 | 8/2012 |
| WO | 93/00171 A1 | 1/1993 |

*Primary Examiner* — Hung D Nguyen
(74) *Attorney, Agent, or Firm* — Im IP Law; Chai Im; C. Andrew Im

(57) ABSTRACT

A nozzle for the additive manufacturing by spraying and fusion of powder along a hollow tapered stream. The nozzle includes an outer cone, an inner cone, and an intermediate cone. The powder is sprayed into the tapered annular space between the inner surface of the outer cone and the outer surface of the intermediate cone. The outer cone includes two portions detachably assembled along the axis of the cone by an assembler.

4 Claims, 1 Drawing Sheet

(51) Int. Cl.
*B05B 12/08* (2006.01)
*B22F 3/105* (2006.01)
*B33Y 30/00* (2015.01)
*B05B 15/18* (2018.01)
*B05B 15/14* (2018.01)

(52) U.S. Cl.
CPC ............ *B22F 3/1055* (2013.01); *B33Y 30/00* (2014.12); *B22F 2003/1056* (2013.01); *Y02P 10/295* (2015.11)

(58) Field of Classification Search
CPC ............ B22F 2003/1056; B23K 26/14; B23K 26/142; B23K 26/144; B23K 26/1436; B23K 26/1438; B23K 26/146; B23K 26/1476; B23K 26/1482
USPC .............. 219/121.6, 121.63, 121.64, 121.65, 219/121.66, 121.84, 121.86; 118/300, 118/302, 308, 600, 641–643, 663, 118/665–669, 688, 712
See application file for complete search history.

(56) References Cited

U.S. PATENT DOCUMENTS

| | | | | |
|---|---|---|---|---|
| 4,782,496 | A | * | 11/1988 | Couturier ........... B23K 26/1482 219/121.84 |
| 5,128,508 | A | * | 7/1992 | Klingel .............. B23K 26/1482 219/121.67 |
| 5,321,228 | A | * | 6/1994 | Krause .................... B05B 7/228 219/121.84 |
| 5,418,350 | A | | 5/1995 | Freneaux et al. |
| 5,477,026 | A | | 12/1995 | Buongiorno |
| 5,961,862 | A | * | 10/1999 | Lewis .................. B23K 26/144 219/121.84 |
| 6,534,745 | B1 | * | 3/2003 | Lowney ............. B23K 26/1482 219/121.84 |
| 8,117,985 | B2 | * | 2/2012 | Whitfield ................ B05B 7/228 118/641 |

\* cited by examiner

DEVICE FOR ADDITIVE MANUFACTURING BY SPRAYING AND FUSION OF POWDER

RELATED APPLICATIONS

This application is a § 371 application from PCT/EP2016/082950 filed Dec. 31, 2016, which claims priority from French Patent Application No. 15 02753 filed Dec. 31, 2015, each of which is incorporated herein by reference in its entirety.

FIELD OF THE INVENTION

The invention relates to an additive manufacturing device by spraying and fusion of powder. The invention more particularly relates to a nozzle for the spraying and the fusion by laser of a metal powder for the implementation of the so-called CLAD® method, acronym for "Construction Laser Additive Directe". The CLAD® method is a method of additive manufacturing by deposition, using the spraying/fusion of a powder made of the deposited material, with the fusion of said deposited material being carried out by a laser precisely at the point of deposition of said powder.

BACKGROUND OF THE INVENTION

FIG. 1, relative to the prior art, diagrammatically shows an embodiment of this method. The nozzle (100) for spraying/fusion of the powder consists in 3 concentric cones delimiting between their walls tapered annular spaces that are also concentric. A laser (150) passes through the inner cone (130) through a bore centred on the axis of said cone. The laser is focused on the point (191) where the material deposition (192) is carried out on the item (190) being manufactured. Powder (160) is sprayed in the tapered annular space between the inner surface of the outer cone (110) and the outer surface of an intermediate cone (120), while a gas is blown into the tapered annular space between the inner surface of said intermediate cone (120) and the outer surface of the inner cone (130). The centring of the cones (110, 120, 130) in relation to one another and the adjusting of the parameters result in that the powder is sprayed according to a hollow conical stream the apex of which is, ideally, confounded with the focal point (191) of the laser (150). The distance (193) between the point (191) of material deposition and the front end of the outer cone (110) is commonly about 5 mm. This small distance, increases the risks of collision between the cone and the item or the elements of the manufacturing environment such as the table of the machine or means of clamping, particularly when the operation of additive manufacturing is carried out according to trajectories that implement 5 axes of displacement. In certain circumstances also, built-up heaps of powder are created at the outlet of the annular space between the outer cone (110) and the intermediate cone (120, modifying the shape of the stream of powder, leading to degraded deposition conditions. These conditions require the replacement the outer cone (110).

These repair operations according to prior art are expensive as they require the replacement of the entire outer cone, a precision part, which itself is often made from an expensive material such as copper, although only the end of this part is degraded. In addition, the operation is relatively long, leading to the immobilisation of the machine and the occupation of a qualified technician throughout the entire duration thereof.

OBJECT AND SUMMARY OF THE INVENTION

The invention aims to overcome the disadvantages of prior art and for this purpose relates to a nozzle for the additive manufacturing by spraying/fusion of powder along a hollow tapered stream, comprising:
  an outer cone,
  an inner cone, and
  an intermediate cone,
  with the powder being sprayed into the tapered annular space between the inner surface of the outer cone and the outer surface of the intermediate cone, wherein the outer cone comprises two portions assembled by detachable means along the axis of said cone.

Therefore, the second portion of the first cone can be interchanged and is easily replaced in case of degradation of the latter.

The invention is advantageously implemented according to the embodiments and variants disclosed hereinafter, which are to be considered individually or according to any technically operative combination.

According to an advantageous embodiment, the outer cone comprises a ring comprising an inner tapered bore and an outer centring device coaxial with said tapered bore, with the second portion of the outer cone being centred on said centring device. This embodiment provides a perfect centring, without requiring any adjustment, of the second portion of the outer cone in relation to the first portion of said cone.

According to an embodiment of the nozzle of the invention, the first and the second portion of the outer cone are made of different materials. Thus, the materials are optimised to respond to the main functions of these two portions.

According to a particular embodiment, the inner tapered bore of the second portion of the outer cone is of a conicity that is different from that of the tapered bore of the first portion. This embodiment makes it possible to vary the shape of the stream and in particular the focal distance of the stream in relation to the end of the nozzle.

Advantageously, the second portion of the outer cone comprises a fusible portion able to break or to be deformed under a determined force. Therefore, in case of a collision with the manufactured item, the force is determined in such a way that the item is not damaged. Alternatively, the fusible portion is sized to break before the deformation thereof damages the intermediate cone.

Advantageously, the nozzle of the invention comprises means for detecting the rupture of the fusible portion of the outer cone. Thus, in case of a severe collision, the rupture of the cone is detected and the additive manufacturing is interrupted so as to not irremediably degrade the quality of the item being manufactured.

BRIEF DESCRIPTION OF THE DRAWINGS

The invention is disclosed hereinafter according to its preferred embodiments, which are in no way limiting, and in reference to FIGS. 1 and 2, wherein.

DETAILED DESCRIPTION OF THE EMBODIMENTS

Figure 1:
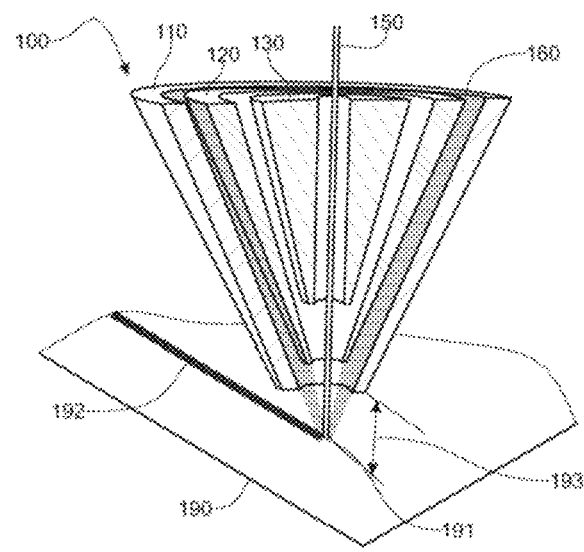
FIG. 1, relative to prior art, shows according to a cross-section principle view in perspective the 3 cones used in the CLAD® method.
Figure 2:
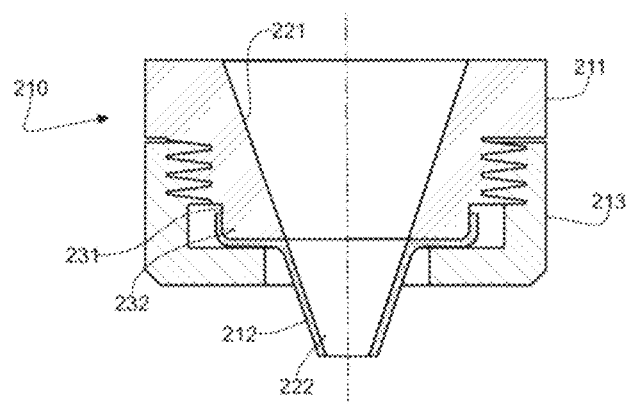
FIG. 2 shows according to a front view and the same section as FIG. 1, an embodiment of the outer cone of the spraying nozzle object of the invention.

FIG. 2, according to an embodiment the outer cone (210) of the nozzle of the invention comprises two portions (211, 212). According to this embodiment, the first portion (211) of the outer cone (210) is made of a steel that can resist the abrasive action of the powder sprayed during the method of additive manufacturing. This first portion, that is in the form of a ring, comprises a tapered bore (221) according to a first conicity, and ends with a centring portion (231). According to this embodiment said portion (231) is a cylindrical male portion. Alternatively, this centring portion comprises a cylindrical or tapered counterbore at the end of said first portion (211). The second portion (212) of the first cone comprises a centring portion (232), able to cooperate with the centring portion (231) of the first portion. The second portion comprises a tapered bore (222), which according to this embodiment, is of the same conicity as the tapered bore (221) of the first portion that it extends. The means for centring (231,232) of the two portions (211,212) provides the coaxiality of the two tapered bores. According to an alternative embodiment (not shown), the conicity of the two bores (221, 222) is significantly different, in such a way as to, for example, modifying the shape of the stream and its focal point at the outlet of the nozzle.

According to this embodiment, the second portion (212) of the outer cone is made of copper in such so as to limit its sensitivity to the laser in the case where the beam would directly or via reflection touch the walls of said second portion. According to an embodiment, the thickness of this second portion is chosen so that in case of collision of this portion (212) of the cone with the item being manufactured or with a portion of the machine, said portion (212) is deformed without damaging the antagonistic portion.

According to another embodiment, not shown, all or a portion of the second portion (212) of the cone according to the invention is made of a brittle material, for example, ceramic. This embodiment allows, where applicable, this second portion to better resist the abrasion caused by the passage of the sprayed metal powder, and on the other hand to break under a determined force, thus preventing, through the excessive deformation thereof, said second portion (212) from damaging the intermediate cone in case of collision. Advantageously, means (not shown), make it possible to detect such a rupture of the fusible portion so as to stop the machine in case of such a collision. These means are for example formed by a deformation gauge fixed on the fusible portion of the second portion (212) of the cone or between the fusible portion and the remainder of said second portion. These means are pre-installed on said second portion and comprise means of electrical connection to a connector on the spindle of the manufacturing machine.

According to this embodiment, the second portion (212) of the outer cone (210) is fixed on the first portion (211) of said cone by way of a nut (213) engaged on a cylindrical threaded portion of the first portion (211) of said cone. According to this embodiment, the threaded portion is of a diameter greater than the diameter of the male centring device (231) of this first portion. Alternatively, the second (212) portion of the cone is fixed by a plurality of screws at the end of the first portion. Alternatively, again, the second portion of the cone is screwed on the first portion, for example by means of a tapered threading providing both the centring and the fastening of the two portions (211, 212) with respect to one another.

The description hereinabove and the embodiments, show that the invention achieves the targeted purpose, in particular, it draws advantage from the construction in two detachable portions of the outer cone of the nozzle, not only to reduce the costs of replacing and repairing the nozzle in case of collision, but provides additional advantages in the conducting and in the security of the method of additive manufacturing by spraying of powder.

The invention claimed is:

1. A nozzle for additive manufacturing by spraying and fusion of powder along a hollow tapered stream, comprising:
   an outer cone comprises:
      a first portion comprising a ring comprising an inner tapered bore and a centring device coaxial with the inner tapered bore; and
      a second portion detachably assembled to the first portion along an axis of the outer cone by an assembler, centered on the centring device;
   an inner cone;
   an intermediate cone; and
   wherein the powder being sprayed into a tapered annular space between an inner surface of the outer cone and an outer surface of the intermediate cone;
   wherein the second portion of the outer cone comprises a fusible portion configured to break or be deformed under a predetermined force without damaging the first portion.

2. The nozzle according to claim 1, wherein the first portion and the second portion of the outer cone are made of different materials.

3. The nozzle according to claim 1, wherein a conicity of an inner tapered bore of the second portion of the outer cone is different from a conicity of the inner tapered bore of the first portion.

4. The nozzle according to claim 1, wherein the assembler is a nut.

* * * * *